United States Patent [19]

Nesvadba et al.

[11] 4,273,578

[45] Jun. 16, 1981

[54] METHOD FOR RECOVERING RHODIUM

[75] Inventors: Paul Nesvadba, Nidderau; Gisela Weigl, Rodenbach, both of Fed. Rep. of Germany

[73] Assignee: W. C. Heraeus GmbH, Hanau, Fed. Rep. of Germany

[21] Appl. No.: 130,644

[22] Filed: Mar. 17, 1980

[30] Foreign Application Priority Data

Mar. 22, 1979 [DE] Fed. Rep. of Germany ....... 2911193

[51] Int. Cl.³ .................... C22B 11/00; C01G 55/00
[52] U.S. Cl. ......................................... 75/83; 423/22; 75/121; 252/411 R; 252/413
[58] Field of Search ............. 423/22; 75/121, 83; 252/411 R, 412, 413

[56] References Cited

U.S. PATENT DOCUMENTS

| | | | |
|---|---|---|---|
| 3,218,161 | 11/1965 | Kunda et al. | 423/22 |
| 3,887,489 | 6/1975 | Fannin et al. | 75/121 |
| 3,978,148 | 8/1976 | Citron | 423/22 |
| 4,131,640 | 12/1978 | Kutepow et al. | 423/22 |
| 4,135,911 | 1/1979 | Balmat | 423/22 |
| 4,188,363 | 2/1980 | Fell et al. | 423/22 |

FOREIGN PATENT DOCUMENTS

| | | | |
|---|---|---|---|
| 879601 | 8/1971 | Canada | 423/22 |
| 941985 | 11/1963 | United Kingdom | 423/22 |
| 941986 | 11/1963 | United Kingdom | 423/22 |

*Primary Examiner*—Herbert T. Carter
*Attorney, Agent, or Firm*—Sprung, Felfe, Horn, Lynch & Kramer

[57] ABSTRACT

A method for recovering rhodium from a residue of the oxo synthesis or of a hydroformylation which comprises contracting said residue with sulfur and separating and converting the resultant rhodium-containing precipitate to rhodium or a rhodium compound in a manner known per se.

11 Claims, No Drawings

METHOD FOR RECOVERING RHODIUM

BACKGROUND OF THE INVENTION

1. Field of the Invention

The invention relates to a method for recovering rhodium from residues of the oxo synthesis and/or hydroformylation.

2. Discussion of the Prior Art

Besides cobalt, rhodium catalysts are increasingly used in oxo synthesis. After the distillative separation of the desired oxo synthesis products, rhodium is present in soluble form in the remaining high-boiling distillation residues.

Numerous processes are known for the recovery of this valuable metal. Thus, for example, German Offenlegungsschriften Nos. 2 448 005 and 2 614 799 describe methods for the separation of rhodium-phosphine-carbonyls from rhodium salt solutions resulting at the treatment of distillation residues of hydroformylation mixtures with acids and peroxides.

According to German Offenlegungsschrift No. 2 448 005, the salt solutions are reacted in the presence of a water soluble organic solvent with halogen hydracids or alkali metal halides, phosphines and carbon monoxide and the precipitating rhodium phosphine carbonyls separated, and according to German Offenlegungsschrift No. 26 14 799 they are treated with a cation exchanger for the separation of rhodium ions.

According to the method of German Auslegeschrift No. 2 637 262, a hydrogen stream can be introduced into the byproducts containing the rhodium catalyst for removing organic substances, the residue containing the rhodium in high concentration can be dissolved in an inorganic acid, and the resulting water soluble rhodium compound can be processed or re-used as catalyst.

German Auslegeschrift No. 1 295 537 describes a process for recovering rhodium as metal by blowing water vapor into the hydroformylation mixture.

In the method known from German Offenlegungsschrift No. 2 502 233, the raw products of the hydroformylation or the secondary fractions of the distillation containing rhodium and triphenyl phosphine are treated with a strong acid and an aldehyde and thereby a solid rhodium complex and an aqueous solution containing the triphenyl phosphine obtained.

SUMMARY OF THE INVENTION

It is an object of this invention to provide a method for recovering rhodium from residues of the oxo synthesis which provides maximum recovery of the rhodium in a simple manner, even from large amounts of residues.

According to the invention, this object is achieved by reacting the residue with sulfur, separating the resultant rhodium-containing precipitate and processing the same to rhodium or a rhodium compound, in a manner known per se.

The new method can be carried out with elemental sulfur or with a compound which splits off sulfur under the reaction conditions. Suitable sulfur-separating compounds are, for example, thiosulfates such as sodium thiosulfate, and poly-thionates such as potassium tetrathionate.

The relatively simple and inexpensive method allows a recovery of rhodium in yields of up to 99 weight-% from such residues.

While the new method is preferable effected without addition of an organic solvent, it may be necessary under certain conditions, e.g. when the residues to be processed are very viscous, to add a suitable solvent, e.g. acetic acid or a short-chain alcohol.

According to the invention the reaction is preferable effected at temperature above 50° C. and particularly between 60° and 140° C. Pressures can vary from 760 Torr to 50 atmospheres with atmospheric pressure preferred.

The new method is particularly suited for the processing of residues that contain additonally free triphenyl phosphine.

The separation of the resulting rhodium-containing precipitate from the reaction mixture is effected in the manner known per se by centrifuging or filtering, an addition of active carbon being of an advantage.

After the separation, the precipitate is processed according to known methods, e.g. by smelting with pyrosulfate, common salt or lead, to give rhodium and/or a rhodium compound.

The following examples will serve to explain more fully the method according to the invention.

EXAMPLE 1

200 ml of the residue from the oxo synthesis containing 300 ppm rhodium, and 5 g sulfur are boiled in a 500 ml round-bottom flask under constant stirring and under a reflux condenser for a period of 4 hours so as to form a rhodium-containing precipitate. The precipitate is then filtered off and processed by melting with pyrosulfate to rhodium sulfate. Less than 5 ppm rhodium are found in the filtrate. The yield in rhodium is more than 98 weight-%.

EXAMPLE 2

200 ml of the residue from the oxo synthesis containing 300 ppm rhodium are mixed in a 500 ml round-bottom flask with 25 ml concentrated acetic acid. 100 ml of a 15-percent aqueous sodium thiosulfate solution are then added, and the resultant mixture is boiled under constant stirring and reflux condenser for a period of 4 hours to form a rhodium-containing precipitate. After cooling down, the organic and aqueous phases are separated from one another, and the rhodium containing precipitate is filtered off. By melting with pyrosulfate, rhodium sulfate is obtained from the rhodium containing precipitate. The organic phase still contains 10 ppm, and the aqueous phase less than 0.5 ppm rhodium. The yield in rhodium is about 97 weight-%.

EXAMPLE 3

200 ml of the residue from the oxo synthesis that contains 300 ppm rhodium are mixed in a 500 ml round flask with 25 ml concentrated acetic acid. After addition of 5 g sulfur, the mixture is boiled for 4 hours under a reflux condenser and forms a rhodium containing precipitate. The precipitate is filtered off and processed by melting with pyrosulfate. The filtrate contains less than 5 ppm rhodium. The yield in rhodium is more than 98 weight-%.

What is claimed:

1. A process for recovering rhodium from a residue of the oxo synthesis or of a hydroformylation which comprises contacting at a temperature of 60° to 140° C. said residue with sulfur or a compound which under the reaction conditions splits off sulfur whereby there is formed a rhodium-containing precipitate and separating the resultant rhodium-containing precipitate from said residue.

2. A method according to claim 1, wherein elemental sulfur is used.

3. A method according to claim 1, wherein a compound which splits off sulfur under the reaction conditions is used.

4. A method according to claim 3, wherein as compound splitting off sulfur, sodium thiosulfate is used.

5. A method according to claim 1, wherein the reaction takes place in the presence of acetic acid.

6. A process according to claim 1, wherein the so-separated rhodium-containing precipitate is thereafter converted to rhodium or a rhodium compound.

7. A process according to claim 6, wherein the rhodium precipitate is smelted with pyrosulfate, common salt or lead to give rhodium and/or a rhodium compound.

8. A process according to claim 1, wherein the reaction of the rhodium-containing residue with sulfur or a compound which under the reaction conditions splits off sulfur, is effected at a pressure between 760 Torr and 50 atmospheres.

9. A process according to claim 1, wherein the rhodium-containing precipitate is separated from the reaction mixture by centrifugation.

10. A process according to claim 1, wherein the rhodium-containing precipitate is separated from the reaction mixture by filtration.

11. A process according to claim 1, wherein the process is carried out at atmospheric pressure.

* * * * *